(12) United States Patent
Kato et al.

(10) Patent No.: US 8,802,159 B2
(45) Date of Patent: Aug. 12, 2014

(54) PRODUCTION METHOD OF TITANIUM OXIDE SOL

(75) Inventors: Hirokazu Kato, Sodegaura (JP); Natsumi Tsuihiji, Sodegaura (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 220 days.

(21) Appl. No.: 13/128,496

(22) PCT Filed: Oct. 27, 2009

(86) PCT No.: PCT/JP2009/068398
§ 371 (c)(1),
(2), (4) Date: Jun. 20, 2011

(87) PCT Pub. No.: WO2010/055770
PCT Pub. Date: May 20, 2010

(65) Prior Publication Data
US 2011/0274767 A1    Nov. 10, 2011

(30) Foreign Application Priority Data

Nov. 12, 2008  (JP) ................................. 2008-289452

(51) Int. Cl.
| | | |
|---|---|---|
| *A01N 59/16* | (2006.01) | |
| *B01J 21/06* | (2006.01) | |
| *H01B 1/02* | (2006.01) | |
| *A01P 1/00* | (2006.01) | |
| *C01G 23/053* | (2006.01) | |
| *B01J 13/00* | (2006.01) | |
| *C09C 1/36* | (2006.01) | |

(52) U.S. Cl.
CPC ........... *B01J 13/0047* (2013.01); *C01G 23/053* (2013.01); *C09C 1/3669* (2013.01)
USPC ...... 424/617; 502/350; 252/520.2; 252/519.3

(58) Field of Classification Search
None
See application file for complete search history.

(56) References Cited

U.S. PATENT DOCUMENTS

| 4,543,341 A * | 9/1985 | Barringer et al. .................. 501/1 |
| 2003/0109589 A1 | 6/2003 | Chane-Ching |
| 2008/0293831 A1 * | 11/2008 | Kato et al. ...................... 516/90 |
| 2009/0078154 A1 | 3/2009 | Sasaki et al. |
| 2009/0252693 A1 | 10/2009 | Baldi et al. |
| 2010/0009192 A1 * | 1/2010 | Wada et al. ................... 428/402 |

FOREIGN PATENT DOCUMENTS

| CN | 1699181 A | 11/2005 | |
| CN | 1792817 A | 6/2006 | |
| EP | 1 994 979 A1 | 11/2008 | |
| JP | A-62-207718 | 9/1987 | |
| JP | A-07-232925 | 9/1995 | |
| JP | A-2001-081357 | 3/2001 | |
| JP | A-2001-262007 | 9/2001 | |
| JP | A-2003-095657 | 4/2003 | |
| JP | A-2003-192348 | 7/2003 | |
| JP | A-2004-505173 | 2/2004 | |
| JP | WO2008038592 | * 4/2008 | ........... C01G 23/053 |
| JP | A-2008-522931 | 7/2008 | |
| JP | A-2008-239368 | 10/2008 | |
| WO | WO 2004/087578 A1 | 10/2004 | |
| WO | WO 2006/109705 A1 | 10/2006 | |
| WO | WO 2008/038592 A1 | 4/2008 | |
| WO | WO 2009/029856 A1 | 3/2009 | |

OTHER PUBLICATIONS

International Search Report issued in Application No. PCT/JP2009/068398; Dated Jan. 26, 2010.
Oct. 30, 2013 Supplementary European Search Report issued in EP 09 82 6020.
Chinese Patent Office, Office Action dated Mar. 25, 2013 in Chinese Patent Application No. 2013032000785400.
Chinese Patent Office, Office Action dated Nov. 21, 2013 in Chinese Patent Application No. 2013111801167890.
Ohya T. et al., "Synthesis and Characterization of Halogen-free, Transparent, Aqueous Colloidal Titanate Solutions from Titanium Alkoxide", Chemistry of Materials, 2002, vol. 14, No. 7, pp. 3082-3089.

* cited by examiner

*Primary Examiner* — Mina Haghighatian
*Assistant Examiner* — Erin Hirt
(74) *Attorney, Agent, or Firm* — Oliff PLC

(57) ABSTRACT

There is provided a method for efficiently producing an anatase-type titanium oxide sol in an extremely advantageous dispersion state. The method comprises mixing a titanium alkoxide, an organic acid, and a quaternary ammonium hydroxide with water in a molar ratio of the organic acid of 0.4 to 4.0 relative to 1 mol of a titanium atom of the titanium alkoxide and in a molar ratio of the quaternary ammonium hydroxide of 0.8 to 1.9 relative to 1 mol of the organic acid to prepare an aqueous mixed solution having a concentration in terms of $TiO_2$ of 0.5 to 10% by mass; heating the aqueous mixed solution to 50 to 100° C. to remove an alcohol; and subjecting the resulting titanium-containing aqueous solution to a hydrothermal treatment at 110 to 170° C.

5 Claims, No Drawings

PRODUCTION METHOD OF TITANIUM OXIDE SOL

TECHNICAL FIELD

The present invention relates to a production method of an anatase-type titanium oxide sol useful for applications such as catalysts, photocatalysts, optical materials, antimicrobial, and antifouling.

BACKGROUND ART

The crystal structure of titanium oxide has three types that are a rutile type of a tetragonal high-temperature type, an anatase type of a tetragonal low-temperature type, and an orthorhombic brookite type, and the anatase-type titanium oxide is known to have high photocatalytic action and high photohydrophilic action.

For the photocatalytic action of titanium oxide, it is known that in the surface of titanium oxide, active oxygen such as $O_2^-$ (super oxide ion) and —OH (hydroxyl radical) is generated by a photoexcitation with ultraviolet light or the like, so that an action of decomposing organic substances is developed. The photohydrophilic action of titanium oxide is known to be developed by such a mechanism that a hydroxy group is generated in the surface of titanium oxide by a photoexcitation with ultraviolet light or the like, so that the contact angle of titanium oxide relative to water is largely lowered (to 20° or less).

The anatase-type titanium oxide is known to have the highest photocatalytic action and the highest photohydrophilic action among the above three crystal types of titanium oxide and is used in various applications such as antimicrobial, antifouling, deodorizing, odor eliminating, anti-fogging, and hydrophilization.

For more effectively developing the photocatalytic action and photohydrophilic action, titanium oxide having a large specific surface area is advantageous and a titanium oxide sol in which primary particles are fine and are in a homogeneous dispersion state is preferred.

As a production method of an anatase-type titanium oxide sol, there is disclosed a method including reacting a water-soluble titanium compound with ammonia to generate a gel, subjecting the gel to a hydrothermal treatment at 100° C. or more, and adding an acid to the gel (see Patent Document 1). There is also disclosed a method for obtaining a sol by bringing an anatase-type titanium oxide powder in an aqueous phase into contact with either a cation exchanger in the presence of an acid or with an anion exchanger in the presence of an alkali (see Patent Document 2).

As a production method of an anatase-type titanium oxide sol using a titanium alkoxide as a titanium source, there is disclosed a method including adding diethylene glycol as a complexing agent to titanium isopropoxide, distilling off an alcohol from the resultant reaction mixture, adding hydrochloric acid and acetic acid together with water to the reaction mixture, and subjecting the reaction mixture to a reaction under reflux at 180° C. (see Patent Document 3).

There is also disclosed a method including mixing a titanium oxychloride aqueous solution with citric acid, adding ammonia to the resultant reaction mixture, and heating the reaction mixture to 90° C. to obtain a titanium oxide sol (see Patent Document 4).

DISCLOSURE OF THE INVENTION

Problem to be Solved by the Invention

In the method described in Patent Document 1, it is necessary to filter and wash a gel generated by neutralizing a water-soluble titanium compound, which is not efficient. In the method described in Patent Document 2, the easiness to deflocculate the gel varies depending on the type and production method of a titanium oxide powder used as a raw material, so that a titanium oxide sol having a certain quality is difficult to obtain and a deflocculation treatment for a relatively long period (ordinarily several tens of hours) is necessary, which is not efficient. In the method described in Patent Document 3, diethylene glycol remains in the obtained titanium oxide sol and cannot be easily removed, so that the application of the obtained titanium oxide sol becomes limited. In the method described in Patent Document 4, salts derived from a raw material titanium salt are generated, so that the method requires a purification process and cannot be mentioned as an efficient method.

In order to solve the problems described above, it is an object of the present invention to provide a method for efficiently producing an anatase-type titanium oxide sol in an extremely advantageous dispersion state.

Means for Solving the Problem

As a result of assiduous research intended to overcome these disadvantages, the inventors of the present invention have found that by subjecting an aqueous solution of a titanium alkoxide, an organic acid, and a quaternary ammonium hydroxide to a hydrothermal treatment, the above object can be attained, and completed the present invention.

Specifically, the present invention has the gist below.

1. A production method of an anatase-type titanium oxide sol contains the processes (a) to (c):

(a) a process of mixing a titanium alkoxide, an organic acid, and a quaternary ammonium hydroxide with water in a molar ratio of the organic acid of 0.4 to 4.0 relative to 1 mol of a titanium atom of the titanium alkoxide and in a molar ratio of the quaternary ammonium hydroxide of 0.8 to 1.9 relative to 1 mol of the organic acid to prepare an aqueous mixed solution having a concentration in terms of $TiO_2$ of 0.5 to 10% by mass;

(b) a process of heating the aqueous mixed solution to 50 to 100° C. to remove an alcohol to prepare a titanium-containing aqueous solution; and (c) a process of subjecting the titanium-containing aqueous solution to a hydrothermal treatment at 110 to 170° C.

2. In the production method of an anatase-type titanium oxide sol according to 1., the titanium alkoxide is a tetraalkoxy titanium of Formula (1):

$$Ti(OR^1)_4 \quad (1)$$ 

(where $R^1$s are $C_{1-3}$ alkyl groups that are the same as or different from each other).

3. In the production method of an anatase-type titanium oxide sol according to 1., the organic acid is at least one selected from a group consisting of oxalic acid, malonic acid, malic acid, tartaric acid, succinic acid, adipic acid, and itaconic acid.

4. In the production method of an anatase-type titanium oxide sol according to 1., the quaternary ammonium hydroxide is a quaternary ammonium hydroxide of Formula (2):

$$[NR^2R^3R^4R^5]^+OH^- \quad (2)$$ 

(where $R^2$, $R^3$, $R^4$, and $R^5$ are independently a $C_{1-16}$ alkyl group, a phenyl group, a benzyl group, or a $C_{1-2}$ hydroxyalkyl group).

5. In the production method of an anatase-type titanium oxide sol according to 4., the quaternary ammonium hydroxide is tetramethylammonium hydroxide or tetraethylammonium hydroxide.

Effects of the Invention

According to the present invention, an anatase-type titanium oxide sol having high transparency in an extremely advantageous dispersion state can be efficiently produced. The anatase-type titanium oxide obtained in the present invention can be effectively used in applications such as catalysts, photocatalysts, optical materials, antimicrobial, and antifouling.

BEST MODES FOR CARRYING OUT THE INVENTION

As the titanium alkoxide used in the present invention, tetraalkoxy titanium having a $C_{1-3}$ alkoxy group is used. This tetraalkoxy titanium can be a tetraalkoxy titanium of Formula (1):

$$\mathrm{Ti(OR^1)_4} \tag{1}$$

(where Ws are $C_{1-3}$ alkyl groups that are the same as or different from each other).

Although in the tetraalkoxy titanium, four alkoxy groups may be the same as or different from each other, a tetraalkoxy titanium in which all alkoxy groups are the same is preferably used, in terms of easy-availability. Specific examples of the tetraalkoxy titanium include tetramethoxy titanium, tetraethoxy titanium, tetra-n-propoxy titanium, and tetraisopropoxy titanium. These tetraalkoxy titaniums may be used individually or in combination of two or more types thereof.

The organic acid used in the present invention is an organic compound having two carboxy groups in the molecule thereof and as the organic acid, there can be preferably used at least one selected from a group consisting of oxalic acid, malonic acid, malic acid, tartaric acid, succinic acid, adipic acid, and itaconic acid. Among them, oxalic acid or malic acid is more preferably used.

The quaternary ammonium hydroxide used in the present invention can be a quaternary ammonium hydroxide of Formula (2):

$$[NR^2R^3R^4R^5]^+OH^- \tag{2}$$

(where $R^2$, $R^3$, $R^4$, and $R^5$ are independently a $C_{1-16}$ alkyl group, a phenyl group, a benzyl group, or a $C_{1-2}$ hydroxyalkyl group).

Specific examples of the quaternary ammonium hydroxide include tetramethyl ammonium hydroxide, tetraethyl ammonium hydroxide, tetrapropyl ammonium hydroxide, tetrabutyl ammonium hydroxide, octyltrimethyl ammonium hydroxide, hexadecyltrimethyl ammonium hydroxide, trimethylphenyl ammonium hydroxide, tributylmethyl ammonium hydroxide, trioctylmethyl ammonium hydroxide, benzyltrimethyl ammonium hydroxide, benzyltriethyl ammonium hydroxide, benzyltripropyl ammonium hydroxide, benzyltributyl ammonium hydroxide, monomethyltriethanol ammonium hydroxide, and dimethyldiethanol ammonium hydroxide. Among them, tetramethyl ammonium hydroxide or tetraethyl ammonium hydroxide is preferably used.

In the present invention, first in the process (a), the titanium alkoxide, the organic acid, and the quaternary ammonium hydroxide are added to water prepared beforehand to prepare an aqueous mixed solution. The order of adding the titanium alkoxide, the organic acid, and the quaternary ammonium hydroxide is not particularly constrained and any raw material may be added at first. The addition is preferably performed with stirring.

The adding ratio of the titanium alkoxide, the organic acid, and the quaternary ammonium hydroxide to be added are the molar ratio of the organic acid of 0.4 to 4.0 relative to 1 mol of a titanium atom of the titanium alkoxide and the molar ratio of the quaternary ammonium hydroxide of 0.8 to 1.9 relative to 1 mol of the organic acid.

In the case where the adding amount of the organic acid in a molar ratio relative to 1 mol of a titanium atom of the titanium alkoxide is more than 4.0, even when the aqueous mixed solution is subjected to a hydrothermal treatment, a titanium oxide sol is not generated and only an aqueous solution containing a titanium component is obtained. On the other hand, in the case where the adding amount of the organic acid in molar ratio relative to 1 mol of a titanium atom of the titanium alkoxide is less than 0.4, after the hydrothermal treatment, only a suspension in which colloidal particles of titanium oxide are aggregated is obtained and the objective anatase-type titanium oxide sol cannot be obtained.

In the case where the adding amount of the quaternary ammonium hydroxide in molar ratio relative to 1 mol of the organic acid is more than 1.9, only a suspension in which colloidal particles of titanium oxide are aggregated is obtained after the hydrothermal treatment, and the objective anatase-type titanium oxide sol cannot be obtained. On the other hand, in the case where the adding amount of the quaternary ammonium hydroxide in molar ratio relative to 1 mol of the organic acid is less than 0.8, even when the aqueous mixed solution is subjected to the hydrothermal treatment, a titanium oxide sol is not generated and only an aqueous solution containing a titanium component is obtained.

The aqueous mixed solution obtained by adding a titanium alkoxide, an organic acid, and a quaternary ammonium hydroxide to water is prepared by accordingly adjusting the amount of used water so that a concentration in terms of $TiO_2$ becomes 0.5 to 10% by mass. The obtained aqueous mixed solution exhibits a white suspension state.

Next, in the process (b), the aqueous mixed solution obtained in the process (a) is heated to 50 to 100° C. By this heating, the aqueous mixed solution becomes transparent, the titanium alkoxide is decomposed, and an alcohol is by-produced. The heating is performed until a by-produced alcohol is substantially completely removed from the aqueous mixed solution and the removal thereof is completed ordinarily for 2 to 10 hours. During the heating, when the concentration in terms of $TiO_2$ in the aqueous mixed solution exceeds 10% by mass, pure water is accordingly added to the aqueous mixed solution to maintain the concentration in terms of $TiO_2$ at 10% by mass or less. Based on a phenomenon that the solution temperature of the aqueous mixed solution becomes higher than a boiling point of the by-produced alcohol, it can be confirmed that the alcohol is substantially completely removed. By removing the alcohol in the process (b), during the hydrothermal treatment performed in the process (c), it can be prevented that the pressure in an autoclave vessel is unnecessarily elevated, so that in the reaction apparatus design, an unnecessary pressure-tight design can be avoided.

The titanium-containing aqueous solution obtained in the process (b) is charged in an autoclave vessel to be subjected to the hydrothermal treatment in the process (c). The temperature for the hydrothermal treatment is 110 to 170° C., preferably 120 to 170° C. The time for the hydrothermal treatment is 0.5 to 10 hours, preferably 1 to 6 hour(s). After the process (c) is performed, an anatase-type titanium oxide sol is obtained. When the temperature for the hydrothermal treatment is less than 110° C., the reaction becomes unsatisfactory, so that the anatase-type titanium oxide sol cannot be obtained. On the other hand, when the temperature for the hydrothermal treatment is more than 170° C., an aggregation of titanium oxide particles is formed, so that there is obtained not a sol, but a white suspension.

The anatase-type titanium oxide sol obtained by the present invention is confirmed to be a single-phase anatase-type crystal by a powder X-ray diffraction analysis. Under a transmission electron microscope, the anatase-type titanium oxide sol is observed as spherical or ellipsoidal colloidal particles having a primary particle diameter of 3 to 10 nm. The obtained titanium oxide sol has a particle diameter of 5 to 120 nm measured by a dynamic light scattering measuring apparatus. The anatase-type titanium oxide sol has high transparency so that when the anatase-type titanium oxide sol is left to stand still at room temperature for one week, generation of a precipitation is not observed. The anatase-type titanium oxide sol has a pH in a range of 3.0 to 7.0.

The anatase-type titanium oxide sol obtained by the present invention can be washed and/or concentrated using an ultrafiltration method.

EXAMPLES

Example 1

Into a 300 mL beaker, 116.9 g of pure water was charged and thereto, 15.1 g of oxalic acid dihydrate (manufactured by Ube Industries Ltd.), 22.7 g of titanium tetraisopropoxide (manufactured by Kanto Chemical Industry Co., Ltd.; containing 6.4 g in terms of $TiO_2$), and 58.2 g of a 25% by mass tetramethylammonium hydroxide aqueous solution (manufactured by Tama Chemicals Co., Ltd.) were added with stirring. The obtained mixed solution had a molar ratio of oxalic acid/titanium atom of 1.5 and a molar ratio of tetramethylammonium hydroxide/oxalic acid of 1.33.

Two hundred and thirteen point one grams (213.1 g) of the mixed solution was retained in an open system under an atmospheric pressure at 88 to 92° C. for 3 hours and by-produced isopropanol was distilled off to prepare 193.7 g of a titanium-containing aqueous solution. To the obtained titanium-containing aqueous solution, 19.4 g of pure water was added to adjust the concentration in terms of $TiO_2$ of the titanium-containing aqueous solution to 3.0% by mass. After the concentration adjustment, the titanium-containing aqueous solution had a pH of 4.7 and a conductivity of 31.4 mS/cm.

Into a 300 mL stainless steel autoclave vessel, 213.1 g of the titanium-containing aqueous solution was charged and was subjected to a hydrothermal treatment at 140° C. for 5 hours.

The solution was cooled down to room temperature and the retrieved solution after the treatment was a titanium oxide sol having high transparency. The obtained sol had a specific gravity of 1.037, a pH of 3.8, a conductivity of 35.7 mS/cm, a $TiO_2$ concentration of 3.0% by mass, a tetramethylammonium hydroxide concentration of 6.8% by mass, an oxalic acid concentration of 5.1% by mass, a dynamic light scattering method particle diameter (measured by N 5 manufactured by Beckman Coulter, Inc.) of 12 nm, and a viscosity of 3.2 mPa·s (by a B-type viscometer) and in the sol, substantially spherical particles having a primary particle diameter of 5 nm were observed by observation under a transmission electron microscope. A powder obtained by drying the obtained sol at 110° C. was subjected to an X-ray diffraction analysis and was confirmed to be an anatase-type crystal. When the obtained anatase-type titanium oxide sol was left to stand still at room temperature for one month, the sol maintained transparency thereof and generated no precipitation.

Example 2

Into a 300 mL beaker, 116.9 g of pure water was charged and thereto, 15.1 g of oxalic acid dihydrate, 22.7 g of titanium tetraisopropoxide (containing 6.4 g in terms of $TiO_2$), and 80.1 g of a 25% by mass tetramethylammonium hydroxide aqueous solution were added with stirring. The obtained mixed solution had a molar ratio of oxalic acid/titanium atom of 1.5 and a molar ratio of tetramethylammonium hydroxide/oxalic acid of 1.83.

Two hundred and thirteen point one grams (213.1 g) of the mixed solution was retained in an open system under an atmospheric pressure at 88 to 92° C. for 3 hours and by-produced isopropanol was distilled off to prepare 193.7 g of a titanium-containing aqueous solution. To the obtained titanium-containing aqueous solution, 19.4 g of pure water was added to adjust the concentration in terms of $TiO_2$ of the titanium-containing aqueous solution to 3.0% by mass. After the concentration adjustment, the titanium-containing aqueous solution had a pH of 5.6 and a conductivity of 47 mS/cm.

Into a 300 mL stainless steel autoclave vessel, 213.1 g of the titanium-containing aqueous solution was charged and was subjected to a hydrothermal treatment at 140° C. for 5 hours.

The solution was cooled down to room temperature and the retrieved solution after the treatment was a titanium oxide sol having high transparency. The obtained sol had a pH of 4.9, a conductivity of 46.8 mS/cm, a $TiO_2$ concentration of 3.0% by mass, a tetramethylammonium hydroxide concentration of 9.4% by mass, an oxalic acid concentration of 5.1% by mass, and a dynamic light scattering method particle diameter of 34 nm and in the sol, substantially spherical particles having a primary particle diameter of 5 nm were observed by observation under a transmission electron microscope. A powder obtained by drying the obtained sol at 110° C. was subjected to an X-ray diffraction analysis and was confirmed to be an anatase-type crystal. When the obtained anatase-type titanium oxide sol was left to stand still at room temperature for one month, the transparency of the sol was maintained and no precipitation generated.

Example 3

Into a 300 mL beaker, 129.7 g of pure water was charged and thereto, 6.3 g of oxalic acid dihydrate, 28.4 g of titanium tetraisopropoxide (containing 8.0 g in terms of $TiO_2$), and 27.3 g of a 25% by mass tetramethylammonium hydroxide aqueous solution were added with stirring. The obtained mixed solution had a molar ratio of oxalic acid/titanium atom of 0.5 and a molar ratio of tetramethylammonium hydroxide/oxalic acid of 1.5.

One hundred and ninety-nine point seven grams (199.7 g) of the mixed solution was retained in an open system under an atmospheric pressure at 88 to 92° C. for 3 hours and by-produced isopropanol was distilled off to prepare 181.5 g of a titanium-containing aqueous solution. To the obtained titanium-containing aqueous solution, 18.2 g of pure water was added to adjust the concentration in terms of $TiO_2$ of the titanium-containing aqueous solution to 3.0% by mass. After the concentration adjustment, the titanium-containing aqueous solution had a pH of 4.5 and a conductivity of 23.4 mS/cm.

Into a 300 mL stainless steel autoclave vessel, 199.7 g of the titanium-containing aqueous solution was charged and was subjected to a hydrothermal treatment at 140° C. for 5 hours.

The solution was cooled down to room temperature and the retrieved solution after the treatment was a titanium oxide sol having high transparency. The obtained sol had a pH of 4.2, a conductivity of 24.2 mS/cm, a $TiO_2$ concentration of 3.0% by mass, a tetramethylammonium hydroxide concentration of 3.4% by mass, an oxalic acid concentration of 2.3% by mass, and a dynamic light scattering method particle diameter of 100 nm and in the sol, substantially spherical particles having a primary particle diameter of 5 nm were observed by observation under a transmission electron microscope. A powder obtained by drying the obtained sol at 110° C. was subjected to an X-ray diffraction analysis and was confirmed to be an anatase-type crystal. When the obtained anatase-type titanium oxide sol was left to stand still at room temperature for one month, the transparency of the sol was maintained and no precipitation generated.

Example 4

Into a 300 mL beaker, 8.1 g of pure water was charged and thereto, 30.3 g of oxalic acid dihydrate, 22.7 g of titanium tetraisopropoxide (containing 6.4 g in terms of $TiO_2$), and 145.6 g of a 25% by mass tetramethylammonium hydroxide aqueous solution were added with stirring. The obtained mixed solution had a molar ratio of oxalic acid/titanium atom of 3 and a molar ratio of tetramethylammonium hydroxide/oxalic acid of 1.67.

Two hundred and thirteen point one grams (213.1 g) of the mixed solution was retained in an open system under an atmospheric pressure at 88 to 92° C. for 3 hours and by-produced isopropanol was distilled off to prepare 193.7 g of a titanium-containing aqueous solution. To the obtained titanium-containing aqueous solution, 19.4 g of pure water was added to adjust the concentration in terms of $TiO_2$ of the titanium-containing aqueous solution to 3.0% by mass. After the concentration adjustment, the titanium-containing aqueous solution had a pH of 6.4 and a conductivity of 64.5 mS/cm.

Into a 300 mL stainless steel autoclave vessel, 213.1 g of the titanium-containing aqueous solution was charged and was subjected to a hydrothermal treatment at 140° C. for 5 hours.

The solution was cooled down to room temperature and the retrieved solution after the treatment was a titanium oxide sol having high transparency. The obtained sol had a pH of 4.9, a conductivity of 70.2 mS/cm, a $TiO_2$ concentration of 3.0% by mass, a tetramethylammonium hydroxide concentration of 17.1% by mass, an oxalic acid concentration of 10.2% by mass, and a dynamic light scattering method particle diameter of 10 nm and in the sol, 3 to 7 substantially spherical particles having a primary particle diameter of 4 nm were observed to be aggregated by observation under a transmission electron microscope. A powder obtained by drying the obtained sol at 110° C. was subjected to an X-ray diffraction analysis and was confirmed to be an anatase-type crystal. When the obtained anatase-type titanium oxide sol was left to stand still at room temperature for one month, the transparency of the sol was maintained and no precipitation generated.

Example 5

The operation was performed in the same manner as in Example 1, except that the temperature for the hydrothermal treatment was changed to 120° C., to obtain a titanium oxide sol having high transparency. The obtained sol had a pH of 4.0, a conductivity of 32.8 mS/cm, a $TiO_2$ concentration of 3.0% by mass, a tetramethylammonium hydroxide concentration of 6.8% by mass, an oxalic acid concentration of 5.1% by mass, and a dynamic light scattering method particle diameter of 12 nm and in the sol, substantially spherical particles having a primary particle diameter of 5 nm were observed by observation under a transmission electron microscope. A powder obtained by drying the obtained sol at 110° C. was subjected to an X-ray diffraction analysis and was confirmed to be an anatase-type crystal. When the obtained anatase-type titanium oxide sol was left to stand still at room temperature for one month, the transparency of the sol was maintained and no precipitation generated.

Example 6

The operation was performed in the same manner as in Example 1, except that the temperature for the hydrothermal treatment was changed to 160° C., to obtain a titanium oxide sol having high transparency. The obtained sol had a pH of 4.1, a conductivity of 35.5 mS/cm, a $TiO_2$ concentration of 3.0% by mass, a tetramethylammonium hydroxide concentration of 6.8% by mass, an oxalic acid concentration of 5.1% by mass, and a dynamic light scattering method particle diameter of 97 nm and in the sol, substantially spherical particles having a primary particle diameter of 7 nm were observed by observation under a transmission electron microscope. A powder obtained by drying the obtained sol at 110° C. was subjected to an X-ray diffraction analysis and was confirmed to be an anatase-type crystal. When the obtained anatase-type titanium oxide sol was left to stand still at room temperature for one month, the transparency of the sol was maintained and no precipitation generated.

Example 7

The operation was performed in the same manner as in Example 1, except that the time for the hydrothermal treatment was changed to 1 hour, to obtain a titanium oxide sol having high transparency. The obtained sol had a pH of 4.1, a conductivity of 32.8 mS/cm, a $TiO_2$ concentration of 3.0% by mass, a tetramethylammonium hydroxide concentration of 6.8% by mass, an oxalic acid concentration of 5.1% by mass, and a dynamic light scattering method particle diameter of 11 nm and in the sol, substantially spherical particles having a primary particle diameter of 5 nm were observed by observation under a transmission electron microscope. A powder obtained by drying the obtained sol at 110° C. was subjected to an X-ray diffraction analysis and was confirmed to be an anatase-type crystal. When the obtained anatase-type titanium oxide sol was left to stand still at room temperature for one month, the transparency of the sol was maintained and no precipitation generated.

Example 8

Into a 300 mL beaker, 20.8 g of pure water was charged and thereto, 30.3 g of oxalic acid dihydrate, 45.5 g of titanium tetraisopropoxide (containing 12.8 g in terms of $TiO_2$), and 116.5 g of a 25% by mass tetramethylammonium hydroxide aqueous solution were added with stirring. The obtained mixed solution had a molar ratio of oxalic acid/titanium atom of 1.5 and a molar ratio of tetramethylammonium hydroxide/oxalic acid of 1.33.

Two hundred and thirteen point one grams (213.1 g) of the mixed solution was retained in an open system under an atmospheric pressure at 88 to 92° C. for 3 hours and by-produced isopropanol was distilled off to prepare 174.7 g of a titanium-containing aqueous solution. To the obtained titanium-containing aqueous solution, 38.4 g of pure water was added to adjust the concentration in terms of $TiO_2$ of the titanium-containing aqueous solution to 6.0% by mass. After the concentration adjustment, the titanium-containing aqueous solution had a pH of 6.0 and a conductivity of 36.1 mS/cm.

Into a 300 mL stainless steel autoclave vessel, 213.1 g of the titanium-containing aqueous solution was charged and was subjected to a hydrothermal treatment at 140° C. for 5 hours.

The solution was cooled down to room temperature and the retrieved solution after the treatment was a titanium oxide sol having high transparency. The obtained sol had a pH of 4.3, a conductivity of 42.2 mS/cm, a $TiO_2$ concentration of 6.0% by mass, a tetramethylammonium hydroxide concentration of 13.7% by mass, an oxalic acid concentration of 10.2% by mass, and a dynamic light scattering method particle diameter of 10 nm and in the sol, substantially spherical particles having a primary particle diameter of 8 nm were observed by observation under a transmission electron microscope. A powder obtained by drying the obtained sol at 110° C. was subjected to an X-ray diffraction analysis and was confirmed to be an anatase-type crystal. When the obtained anatase-type titanium oxide sol was left to stand still at room temperature for one month, the transparency of the sol was maintained and no precipitation generated.

Example 9

Into a 300 mL beaker, 152.9 g of a 25% by mass tetramethylammonium hydroxide aqueous solution was charged and thereto, 39.7 g of oxalic acid dihydrate and 59.7 g of titanium tetraisopropoxide (containing 16.8 g in terms of $TiO_2$) were added with stirring. The obtained mixed solution had a molar ratio of oxalic acid/titanium atom of 1.5 and a molar ratio of tetramethylammonium hydroxide/oxalic acid of 1.33.

Two hundred and fifty-two point three grams (252.3 g) of the mixed solution was retained in an open system under an atmospheric pressure at 88 to 92° C. for 3 hours and by-produced isopropanol was distilled off to prepare 191.7 g of a titanium-containing aqueous solution. To the obtained titanium-containing aqueous solution, 21.4 g of pure water was added to adjust the concentration in terms of $TiO_2$ of the titanium-containing aqueous solution to 8.0% by mass. After the concentration adjustment, the titanium-containing aqueous solution had a pH of 6.6 and a conductivity of 36 mS/cm.

Into a 300 mL stainless steel autoclave vessel, 213.1 g of the titanium-containing aqueous solution was charged and was subjected to a hydrothermal treatment at 140° C. for 5 hours.

The solution was cooled down to room temperature and the retrieved solution after the treatment was a titanium oxide sol having high transparency. The obtained sol had a pH of 4.7, a conductivity of 42.5 mS/cm, a $TiO_2$ concentration of 8.0% by mass, a tetramethylammonium hydroxide concentration of 17.9% by mass, an oxalic acid concentration of 13.3% by mass, and a dynamic light scattering method particle diameter of 10 nm and in the sol, substantially spherical particles having a primary particle diameter of 8 nm were observed by observation under a transmission electron microscope. A powder obtained by drying the obtained sol at 110° C. was subjected to an X-ray diffraction analysis and was confirmed to be an anatase-type crystal. When the obtained anatase-type titanium oxide sol was left to stand still at room temperature for one month, the transparency of the sol was maintained and no precipitation generated.

Example 10

Into a 300 mL beaker, 116.0 g of pure water was charged and thereto, 16.1 g of DL-malic acid (manufactured by Kanto Chemical Industry Co., Ltd.), 22.7 g of titanium tetraisopropoxide (containing 6.4 g in terms of $TiO_2$), and 58.2 g of a 25% by mass tetramethylammonium hydroxide aqueous solution were added with stirring. The obtained mixed solution had a molar ratio of malic acid/titanium atom of 1.5 and a molar ratio of tetramethylammonium hydroxide/malic acid of 1.33.

Two hundred and thirteen point one grams (213.1 g) of the mixed solution was retained in an open system under an atmospheric pressure at 88 to 92° C. for 3 hours and by-produced isopropanol was distilled off to prepare 193.7 g of a titanium-containing aqueous solution. To the obtained titanium-containing aqueous solution, 19.4 g of pure water was added to adjust the concentration in terms of $TiO_2$ of the titanium-containing aqueous solution to 8.0% by mass. After the concentration adjustment, the titanium-containing aqueous solution had a pH of 5.4 and a conductivity of 26 mS/cm.

Into a 300 mL stainless steel autoclave vessel, 213.1 g of the titanium-containing aqueous solution was charged and was subjected to a hydrothermal treatment at 140° C. for 5 hours.

The solution was cooled down to room temperature and the retrieved solution after the treatment was a titanium oxide sol having high transparency. The obtained sol had a pH of 4.7, a conductivity of 27.1 mS/cm, a $TiO_2$ concentration of 3.0% by mass, a tetramethylammonium hydroxide concentration of 6.8% by mass, a malic acid concentration of 5.4% by mass, and a dynamic light scattering method particle diameter of 9.8 nm and in the sol, substantially spherical particles having a primary particle diameter of 5 nm were observed by observation under a transmission electron microscope. A powder obtained by drying the obtained sol at 110° C. was subjected to an X-ray diffraction analysis and was confirmed to be an anatase-type crystal. When the obtained anatase-type titanium oxide sol was left to stand still at room temperature for one month, the transparency of the sol was maintained and no precipitation generated.

Comparative Example 1

Into a 300 mL beaker, 158.0 g of pure water was charged and thereto, 18.9 g of oxalic acid dihydrate, 8.5 g of titanium tetraisopropoxide (containing 2.4 g in terms of $TiO_2$), and 54.6 g of a 25% by mass tetramethylammonium hydroxide aqueous solution were added with stirring. The obtained mixed solution had a molar ratio of oxalic acid/titanium atom of 5.0 and a molar ratio of tetramethylammonium hydroxide/oxalic acid of 1.0.

Two hundred and forty point zero grams (240.0 g) of the mixed solution was retained in an open system under an atmospheric pressure at 88 to 92° C. for 3 hours and by-produced isopropanol was distilled off to prepare 232.8 g of a titanium-containing aqueous solution. To the obtained titanium-containing aqueous solution, 7.2 g of pure water was added to adjust the concentration in terms of $TiO_2$ of the titanium-containing aqueous solution to 1.0% by mass. After the concentration adjustment, the titanium-containing aqueous solution had a pH of 2.7 and a conductivity of 27.9 mS/cm.

Into a 300 mL stainless steel autoclave vessel, 240.0 g of the titanium-containing aqueous solution was charged and was subjected to a hydrothermal treatment at 140° C. for 5 hours.

The solution was cooled down to room temperature and the retrieved solution after the treatment was not a sol, but a colorless transparent solution. The obtained solution had a pH of 2.9, a conductivity of 28.3 mS/cm, a $TiO_2$ concentration of 1.0% by mass, a tetramethylammonium hydroxide concentration of 5.7% by mass, and an oxalic acid concentration of 5.6% by mass. Although the obtained solution was subjected to observation under a transmission electron microscope, a colloidal particle was not observed.

Comparative Example 2

Into a 300 mL beaker, 87.9 g of pure water was charged and thereto, 15.1 g of oxalic acid dihydrate, 22.7 g of titanium tetraisopropoxide (containing 6.4 g in terms of $TiO_2$), and 87.4 g of a 25% by mass tetramethylammonium hydroxide aqueous solution were added with stirring. The obtained mixed solution had a molar ratio of oxalic acid/titanium atom of 1.5 and a molar ratio of tetramethylammonium hydroxide/oxalic acid of 2.0.

Two hundred and thirteen point one grams (213.1 g) of the mixed solution was retained in an open system under an atmospheric pressure at 88 to 92° C. for 3 hours and by-produced isopropanol was distilled off to prepare 193.7 g of a titanium-containing aqueous solution. To the obtained titanium-containing aqueous solution, 19.4 g of pure water was added to adjust the concentration in terms of $TiO_2$ of the titanium-containing aqueous solution to 3.0% by mass. After the concentration adjustment, the titanium-containing aqueous solution had a pH of 8.9 and a conductivity of 48.2 mS/cm.

Into a 300 mL stainless steel autoclave vessel, 213.1 g of the titanium-containing aqueous solution was charged and was subjected to a hydrothermal treatment at 140° C. for 5 hours.

The solution was cooled down to room temperature and the retrieved suspension after the treatment had a pH of 11.8, a conductivity of 48.4 mS/cm, a $TiO_2$ concentration of 3.0% by mass, a tetramethylammonium hydroxide concentration of 10.3% by mass, an oxalic acid concentration of 5.1% by mass, and a dynamic light scattering method particle diameter of 137 nm, and when the suspension was left to stand still, a white precipitation layer was formed. By observation under a transmission electron microscope, there was observed an ellipsoidal particle having a long axis of 50 nm and a short axis of 8 nm. A powder obtained by drying the white precipitation layer at 110° C. was subjected to an X-ray diffraction analysis and was confirmed to be an anatase-type crystal.

Comparative Example 3

Into a 300 mL beaker, 117.1 g of pure water was charged and thereto, 15.1 g of oxalic acid dihydrate, 22.7 g of titanium tetraisopropoxide (containing 6.4 g in terms of $TiO_2$), and 58.2 g of a 25% by mass tetramethylammonium hydroxide aqueous solution were added with stirring. The obtained mixed solution had a molar ratio of oxalic acid/titanium atom of 1.5 and a molar ratio of tetramethylammonium hydroxide/oxalic acid of 1.33.

Two hundred and thirteen point one grams (213.1 g) of the mixed solution was retained in an open system under an atmospheric pressure at 88 to 92° C. for 3 hours and by-produced isopropanol was distilled off to prepare 193.7 g of a titanium-containing aqueous solution. To the obtained titanium-containing aqueous solution, 19.4 g of pure water was added to adjust the concentration in terms of $TiO_2$ of the titanium-containing aqueous solution to 3.0% by mass. After the concentration adjustment, the titanium-containing aqueous solution had a pH of 4.6 and a conductivity of 31.4 mS/cm.

Into a 300 mL stainless steel autoclave vessel, 213.1 g of the titanium-containing aqueous solution was charged and was subjected to a hydrothermal treatment at 180° C. for 5 hours.

The solution was cooled down to room temperature and the retrieved suspension after the treatment had a pH of 5.6, a conductivity of 35.9 mS/cm, a $TiO_2$ concentration of 3.0% by mass, a tetramethylammonium hydroxide concentration of 6.8% by mass, an oxalic acid concentration of 5.1% by mass, and a dynamic light scattering method particle diameter of 451 nm and when the suspension was left to stand still, a white precipitation layer was formed. By observation under a transmission electron microscope, there was observed that a substantially spherical particle having a primary particle diameter of 13 nm formed an aggregate of 0.4 to 4 µm powder obtained by drying the white precipitation layer at 110° C. was subjected to an X-ray diffraction analysis and was confirmed to be an anatase-type crystal.

Comparative Example 4

Into a 300 mL beaker, 125.1 g of pure water was charged and thereto, 15.1 g of oxalic acid dihydrate, 22.7 g of titanium tetraisopropoxide (containing 6.4 g in terms of $TiO_2$), and 50.6 g of a 10% by mass sodium hydroxide aqueous solution were added with stirring. The obtained mixed solution had a molar ratio of oxalic acid/titanium atom of 1.5 and a molar ratio of sodium hydroxide/oxalic acid of 1.0.

Two hundred and thirteen point one grams (213.1 g) of the mixed solution was retained in an open system under an atmospheric pressure at 88 to 92° C. for 3 hours and by-produced isopropanol was distilled off to prepare 193.7 g of a titanium-containing aqueous solution. To the obtained titanium-containing aqueous solution, 19.4 g of pure water was added to adjust the concentration in terms of $TiO_2$ of the titanium-containing aqueous solution to 3.0% by mass. After the concentration adjustment, the titanium-containing aqueous solution had a pH of 3.5 and a conductivity of 22.5 mS/cm.

Into a 300 mL stainless steel autoclave vessel, 213.1 g of the titanium-containing aqueous solution was charged and was subjected to a hydrothermal treatment at 140° C. for 5 hours.

The solution was cooled down to room temperature and the retrieved suspension after the treatment had a pH of 3.0, a conductivity of 27.4 mS/cm, a $TiO_2$ concentration of 3.0% by mass, a sodium hydroxide concentration of 5.9% by mass, an oxalic acid concentration of 5.1% by mass, and a dynamic light scattering method particle diameter of 2527 nm, and when the suspension was left to stand still, a white precipitation layer was formed. By observation under a transmission electron microscope, there was observed that a substantially spherical particle having a primary particle diameter of 10 to 30 nm formed an aggregate of 0.1 to 0.4 µm. A powder obtained by drying the white precipitation layer at 110° C.

was subjected to an X-ray diffraction analysis and was confirmed to be an anatase-type crystal.

Comparative Example 5

Into a 300 mL beaker, 165.6 g of pure water was charged and thereto, 15.1 g of oxalic acid dihydrate, 22.7 g of titanium tetraisopropoxide (containing 6.4 g in terms of $TiO_2$), and 9.7 g of a 28% by mass ammonia aqueous solution were added with stirring. The obtained mixed solution had a molar ratio of oxalic acid/titanium atom of 1.5 and a molar ratio of ammonia/oxalic acid of 1.33.

Two hundred and thirteen point one grams (213.1 g) of the mixed solution was retained in an open system under an atmospheric pressure at 88 to 92° C. for 3 hours and by-produced isopropanol was distilled off to prepare 193.7 g of a titanium-containing aqueous solution. To the obtained titanium-containing aqueous solution, 19.4 g of pure water was added to adjust the concentration in terms of $TiO_2$ of the titanium-containing aqueous solution to 3.0% by mass. After the concentration adjustment, the titanium-containing aqueous solution had a pH of 4.8 and a conductivity of 37.1 mS/cm.

Into a 300 mL stainless steel autoclave vessel, 213.1 g of the titanium-containing aqueous solution was charged and was subjected to a hydrothermal treatment at 140° C. for 5 hours.

The solution was cooled down to room temperature and the retrieved solution after the treatment was a transparent sol. The resultant sol had a pH of 3.9, a conductivity of 43.8 mS/cm, a $TiO_2$ concentration of 3.0% by mass, an ammonia concentration of 1.1% by mass, an oxalic acid concentration of 5.1% by mass, and a dynamic light scattering method particle diameter of 86 nm. By observation under a transmission electron microscope, there was observed that an ellipsoidal aggregate having a long axis of 50 nm and a short axis of 15 nm formed by substantially spherical particles having a primary particle diameter of 5 nm and a 0.1 to 0.3 μm aggregate formed by 10 to 15 nm rectangle particles, were mixed. A powder obtained by drying the obtained sol at 110° C. was subjected to an X-ray diffraction analysis and was confirmed to be a crystal in which an anatase-type titanium oxide and a brookite-type titanium oxide were mixed.

The results of Examples 1 to 10 and Comparative Examples 1 to 5 are shown in Table 1.

TABLE 1

|  | Example 1 | Example 2 | Example 3 | Example 4 | Example 5 |
|---|---|---|---|---|---|
| Organic acid | Oxalic acid | Oxalic acid | Oxalic acid | Oxalic acid | Oxalic acid |
| Base | TMAH (*) | TMAH (*) | TMAH (*) | TMAH (*) | TMAH (*) |
| Organic acid/Ti atom (molar ratio) | 1.5 | 1.5 | 0.5 | 3 | 1.5 |
| Base/organic acid (molar ratio) | 1.33 | 1.83 | 1.5 | 1.67 | 1.33 |
| Heating condition | 88 to 92° C. | 88 to 92° C. | 88 to 92° C. | 88 to 92° C. | 88 to 92° C. |
| $TiO_2$ concentration (%) | 3 | 3 | 3 | 3 | 3 |
| Hydrothermal treatment condition | 140° C. × 5 hr | 140° C. × 5 hr | 140° C. × 5 hr | 140° C. × 5 hr | 120° C. × 5 hr |
| [Physical properties after hydrothermal treatment] | | | | | |
| $TiO_2$ concentration (%) | 3 | 3 | 3 | 3 | 3 |
| pH | 3.8 | 4.9 | 4.2 | 4.9 | 4.0 |
| Dynamic light scattering method particle diameter (nm) | 12 | 34 | 100 | 10 | 12 |
| Observation under transition electron microscope | 5 nm, substantially spherical particle | 5 nm, substantially spherical particle | 5 nm, substantially spherical particle | 4 nm, aggregate of 3 to 7 substantially spherical particles | 5 nm, substantially spherical particle |
| X-ray diffraction analysis | Anatase | Anatase | Anatase | Anatase | Anatase |
| Appearance | Transparent sol | Transparent sol | Transparent sol | Transparent sol | Transparent sol |

|  | Example 6 | Example 7 | Example 8 | Example 9 | Example 10 |
|---|---|---|---|---|---|
| Organic acid | Oxalic acid | Oxalic acid | Oxalic acid | Oxalic acid | Malic acid |
| Base | TMAH (*) | TMAH (*) | TMAH (*) | TMAH (*) | TMAH (*) |
| Organic acid/Ti atom (molar ratio) | 1.5 | 1.5 | 1.5 | 1.5 | 1.5 |
| Base/organic acid (molar ratio) | 1.33 | 1.33 | 1.33 | 1.33 | 1.33 |
| Heating condition | 88 to 92° C. | 88 to 92° C. | 88 to 92° C. | 88 to 92° C. | 88 to 92° C. |
| $TiO_2$ concentration (%) | 3 | 3 | 6 | 8 | 3 |
| Hydrothermal treatment condition | 160° C. × 5 hr | 140° C. × 1 hr | 140° C. × 5 hr | 140° C. × 5 hr | 140° C. × 5 hr |
| [Physical properties after hydrothermal treatment] | | | | | |
| $TiO_2$ concentration (%) | 3 | 3 | 6 | 8 | 3 |
| pH | 4.1 | 4.1 | 4.3 | 4.7 | 4.7 |
| Dynamic light scattering method particle diameter (nm) | 97 | 11 | 10 | 10 | 10 |
| Observation under transition electron microscope | 7 nm, substantially spherical particle | 5 nm, substantially spherical particle | 8 nm, substantially spherical particle | 8 nm, substantially spherical particle | 5 nm, substantially spherical particle |
| X-ray diffraction analysis | Anatase | Anatase | Anatase | Anatase | Anatase |

TABLE 1-continued

| Appearance | Transparent sol | Transparent sol | Transparent sol | Transparent sol | Transparent sol |
|---|---|---|---|---|---|
| | Comparative Example 1 | Comparative Example 2 | Comparative Example 3 | Comparative Example 4 | Comparative Example 5 |
| Organic acid | Oxalic acid | Oxalic acid | Oxalic acid | Oxalic acid | Oxalic acid |
| Base | TMAH (*) | TMAH (*) | TMAH (*) | NaOH | Ammonia |
| Organic acid/Ti atom (molar ratio) | 5.0 | 1.5 | 1.5 | 1.5 | 1.5 |
| Base/organic acid (molar ratio) | 1.0 | 2.0 | 1.33 | 1.0 | 1.33 |
| Heating condition | 88 to 92° C. | 88 to 92° C. | 88 to 92° C. | 88 to 92° C. | 88 to 92° C. |
| $TiO_2$ concentration (%) | 1 | 3 | 3 | 3 | 3 |
| Hydrothermal treatment condition | 140° C. × 5 hr | 140° C. × 5 hr | 180° C. × 5 hr | 140° C. × 5 hr | 140° C. × 5 hr |
| [Physical properties after hydrothermal treatment] | | | | | |
| $TiO_2$ concentration (%) | 1 | 3 | 3 | 3 | 3 |
| pH | 2.9 | 11.8 | 5.6 | 3.0 | 3.9 |
| Dynamic light scattering method particle diameter (nm) | — | 137 | 451 | 2527 | 86 |
| Observation under transition electron microscope | Not observed | Ellipsoidal particle (long axis: 50 nm, short axis: 8 nm) | Aggregate (aggregate particle diameter: 0.4 to 4 μm) | Aggregate (aggregate particle diameter: 0.1 to 0.4 μm) | Ellipsoidal aggregate (long axis: 50 nm, short axis: 15 nm) + aggregate (aggregate particle diameter: 0.1 to 0.3 μm) |
| X-ray diffraction analysis | — | Anatase | Anatase | Anatase | Anatase + brookite |
| Appearance | Transparent solution | White precipitate generated | White precipitate generated | White precipitate generated | Transparent sol |

TMAH (*): tetramethylammonium hydroxide

INDUSTRIAL APPLICABILITY

The anatase-type titanium oxide sol obtained by the present invention is in an extremely advantageous dispersion state and is useful for applications such as catalysts, photocatalysts, optical materials, antimicrobial, and antifouling, particularly as titanium oxide for a transparent electrode of a dye-sensitizing type solar battery.

RELATED-ART DOCUMENT

Patent Document

Patent Document 1: Japanese Patent Application Publication No. JP-A-62-207718
Patent Document 2: Japanese Patent Application Publication No. JP-A-7-232925
Patent Document 3: Japanese Translation of PCT International Application No. JP-A-2008-522931
Patent Document 4: Japanese Translation of PCT International Application No. JP-A-2004-505173

The invention claimed is:

1. A production method of an anatase-type titanium oxide sol, comprising the processes (a) to (c):
    (a) mixing a titanium alkoxide, an organic acid, and a quaternary ammonium hydroxide with water in a molar ratio of the organic acid of 0.4 to 4.0 relative to 1 mol of a titanium atom of the titanium alkoxide and in a molar ratio of the quaternary ammonium hydroxide of 0.8 to 1.9 relative to 1 mol of the organic acid to prepare an aqueous mixed solution having a concentration in terms of $TiO_2$ of 0.5 to 10% by mass;
    (b) heating the aqueous mixed solution to 50 to 100° C. to remove an alcohol to prepare a titanium-containing aqueous solution; and
    (c) subjecting the titanium-containing aqueous solution to a hydrothermal treatment at 110 to 170° C.

2. The production method of an anatase-type titanium oxide sol according to claim 1, wherein the titanium alkoxide is a tetraalkoxy titanium of Formula (1):

$$Ti(OR^1)_4 \quad (1)$$

(where $R^1$s are $C_{1-3}$ alkyl groups that are the same as or different from each other).

3. The production method of an anatase-type titanium oxide sol according to claim 1, wherein the organic acid is at least one selected from a group consisting of oxalic acid, malonic acid, malic acid, tartaric acid, succinic acid, adipic acid, and itaconic acid.

4. The production method of an anatase-type titanium oxide sol according to claim 1, wherein the quaternary ammonium hydroxide is a quaternary ammonium hydroxide of Formula (2):

$$[NR^2R^3R^4R^5]^+OH^- \quad (2)$$

(where $R^2$, $R^3$, $R^4$, and $R^5$ are independently a $C_{1-16}$ alkyl group, a phenyl group, a benzyl group, or a $C_{1-2}$ hydroxyalkyl group).

5. The production method of an anatase-type titanium oxide sol according to claim 4, wherein the quaternary ammonium hydroxide is tetramethylammonium hydroxide or tetraethylammonium hydroxide.

* * * * *